(12) United States Patent
Sheu et al.

(10) Patent No.: US 11,474,525 B2
(45) Date of Patent: Oct. 18, 2022

(54) METHOD AND APPARATUS FOR METHOD FOR DYNAMIC MULTI-SEGMENT PATH AND SPEED PROFILE SHAPING

(71) Applicant: GM GLOBAL TECHNOLOGY OPERATIONS LLC, Detroit, MI (US)

(72) Inventors: Shih-Ying Sheu, Rochester Hills, MI (US); Tetyana V. Mamchuk, Walled Lake, MI (US); Paul A. Adam, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 403 days.

(21) Appl. No.: 16/518,115

(22) Filed: Jul. 22, 2019

(65) Prior Publication Data

US 2021/0026358 A1     Jan. 28, 2021

(51) Int. Cl.
| | |
|---|---|
| *G05D 1/02* | (2020.01) |
| *G01S 17/931* | (2020.01) |
| *G06V 20/58* | (2022.01) |
| *G06T 7/70* | (2017.01) |

(52) U.S. Cl.
CPC .......... *G05D 1/0214* (2013.01); *G01S 17/931* (2020.01); *G05D 1/024* (2013.01); *G05D 1/0223* (2013.01); *G05D 1/0246* (2013.01); *G06T 7/70* (2017.01); *G06V 20/58* (2022.01); *G05D 2201/0213* (2013.01); *G06T 2207/10028* (2013.01); *G06T 2207/30261* (2013.01)

(58) Field of Classification Search
CPC .... G05D 1/0214; G05D 1/0223; G05D 1/024; G05D 1/0246; G05D 2201/0213; G06T 7/70; G06T 2207/10028; G06T 2207/30261; G01S 17/931; G06K 9/00805
See application file for complete search history.

(56) References Cited

U.S. PATENT DOCUMENTS

| | | | |
|---|---|---|---|
| 8,352,112 B2 * | 1/2013 | Mudalige | G08G 1/163 |
| | | | 342/458 |
| 9,227,632 B1 * | 1/2016 | Lee | B60W 30/0953 |
| 9,229,453 B1 * | 1/2016 | Lee | B60W 10/184 |
| 2016/0313133 A1 * | 10/2016 | Zeng | B60W 30/0956 |
| 2018/0365888 A1 * | 12/2018 | Satzoda | G06K 9/00791 |
| 2019/0367021 A1 * | 12/2019 | Zhao | B60W 60/0011 |

* cited by examiner

*Primary Examiner* — Ig T An
(74) *Attorney, Agent, or Firm* — Lorenz & Kopf, LLP

(57) ABSTRACT

The present application relates to determining a location of an object in response to a sensor output, generating a first vehicle path in response to the location of the object and a map data, determining an undrivable area within the first vehicle path, generating a waypoint outside of the undrivable area, generating a second vehicle path from a first point on the first vehicle path to the waypoint and a third vehicle path from the waypoint to a second point on the first vehicle path such that the second vehicle path and the third vehicle path are outside of the undrivable area, generating a control signal in response to the second vehicle path, the third vehicle path and and controlling a vehicle in response to the control signal such that the vehicle follows the second vehicle path and the third vehicle path.

20 Claims, 5 Drawing Sheets

METHOD AND APPARATUS FOR METHOD FOR DYNAMIC MULTI-SEGMENT PATH AND SPEED PROFILE SHAPING

BACKGROUND

The present disclosure relates generally to programming motor vehicle control systems. More specifically, aspects of this disclosure relate to systems, methods and devices for providing a local motion trajectory having multiple path segments to deliver smooth vehicle dynamics while avoiding undrivable areas in an ADAS equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Adaptive cruise control systems have been developed where not only does the system maintain the set speed, but also will automatically slow the vehicle down, or perform a lane change action, in the event that a slower moving preceding vehicle is detected using various sensors such as radar and cameras. To perform these functions, the ADAS equipped vehicle must generate a motion path for the vehicle to follow to avoid the preceding vehicle or obstacles within the lane. However, current motion path search algorithms require significant computing resources making their use in low power embedded applications infeasible either due to inability to converge on optimal solution in timely fashion or because algorithm cannot be supported by hardware. In addition, current ADAS systems may have no provision for adjusting a planned path for a vehicle based on external conditions such as undriveable road segment. It would be desirable to overcome these problems to provide a method and apparatus for dynamic path and speed profile shaping in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor operative to detect an object within a field of view, a vehicle controller operative to control a vehicle in response to a control signal, a memory operative to store a map data, a processor for generating a first vehicle path in response to the object and the map data, for determining an undrivable area within the first vehicle path, for generating a waypoint outside of the undrivable area, for generating a second vehicle path from a first point on the first vehicle path to the waypoint and a third vehicle path from the waypoint to a second point on the first vehicle path such that the second vehicle path and the third vehicle path are outside of the undrivable area, predicting a first lateral acceleration in response to the second vehicle path and a second lateral acceleration in response to the third vehicle path and for generating a control signal in response to the second vehicle path, the first lateral acceleration, the third vehicle path and the second lateral acceleration and coupling the control signal to the vehicle controller.

In accordance with another aspect of the present invention wherein the sensor includes a camera operative to capture an image and wherein the object is detected in response to an image processing operation.

In accordance with another aspect of the present invention wherein the sensor is a lidar and wherein the object is detected in response to a point map generated by the lidar.

In accordance with another aspect of the present invention wherein the vehicle controller is operative to control the vehicle such that the vehicle follows the second vehicle path and the third vehicle path.

In accordance with another aspect of the present invention wherein the object is a proximate vehicle and the undrivable area is a bounded area around the proximate vehicle.

In accordance with another aspect of the present invention wherein the second vehicle path and the third vehicle path are generated in response to a quintic function.

In accordance with another aspect of the present invention wherein the waypoint is generated in response to projecting a circle between a starting point and a merge point on the first vehicle path and wherein the waypoint is located on the circle between the starting point and the merge point.

In accordance with another aspect of the present invention further including a global positioning sensor for determining a location of the vehicle and wherein the first vehicle path and the second vehicle path are generated in response to the location of the vehicle.

In accordance with another aspect of the present invention a method performed by a processor comprising determining a location of an object in response to a sensor output, receiving a map data via a wireless network, generating a first vehicle path in response to the location of the object and the map data, determining an undrivable area within the first vehicle path, generating a waypoint outside of the undrivable area, generating a second vehicle path from a first point on the first vehicle path to the waypoint and a third vehicle path from the waypoint to a second point on the first vehicle path such that the second vehicle path and the third vehicle path are outside of the undrivable area, predicting a first lateral acceleration in response to the second vehicle path and a second lateral acceleration in response to the third vehicle path, generating a control signal in response to the second vehicle path, the first lateral acceleration, the third vehicle path and the second lateral acceleration, and controlling a vehicle in response to the control signal such that the vehicle follows the second vehicle path and the third vehicle path.

In accordance with another aspect of the present invention wherein the sensor output is an image captured by a camera and wherein the location of the object is determined in response to an image processing operation.

In accordance with another aspect of the present invention wherein the sensor output is a point map captured by a lidar and wherein the location of the object is determined in response to the point map.

In accordance with another aspect of the present invention wherein the object is a proximate vehicle and wherein the undrivable area is a bounded area around the proximate vehicle.

In accordance with another aspect of the present invention wherein the second vehicle path and the third vehicle path are generated in response to a quintic function.

In accordance with another aspect of the present invention wherein the waypoint is generated in response to projecting a circle between a starting point and a merge point on the first vehicle path and wherein the waypoint is located on the circle between the starting point and the merge point.

In accordance with another aspect of the present invention further including reducing a vehicle speed in response to the first lateral acceleration exceeding a threshold lateral acceleration limit.

In accordance with another aspect of the present invention further including further including reducing a vehicle speed in response to the second lateral acceleration exceeding a threshold lateral acceleration limit.

In accordance with another aspect of the present invention an advanced driver assistance system for controlling a host vehicle comprising a camera operative to capture an image of a field of view, a lidar operative to generate a point map of the field of view, a sensor fusion processor operative to process the image and the point map to generate a three dimensional representation of the field of view, a processor operative to generate a first vehicle path in response to the three dimensional representation of the field of view, for determining an undrivable area within the first vehicle path, for generating a waypoint outside of the undrivable area, for generating a second vehicle path from a first point on the first vehicle path to the waypoint and a third vehicle path from the waypoint to a second point on the first vehicle path such that the second vehicle path and the third vehicle path are outside of the undrivable area and for generating a control signal in response to the second vehicle path and the third vehicle path and coupling the control signal to the vehicle controller, and a controller operative to control the host vehicle along the second vehicle path and the third vehicle path in response to the control signal.

In accordance with another aspect of the present invention further including a memory for storing a map data and wherein the undrivable area is determined in response to the map data.

In accordance with another aspect of the present invention a user interface operative to receive a user input and wherein the first vehicle path is generated in response to the user input.

In accordance with another aspect of the present invention wherein the processor is operative to determine a maximum lateral acceleration along the second vehicle path and the third vehicle path and the controller is operative to reduce a host vehicle speed in response to the maximum lateral acceleration.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
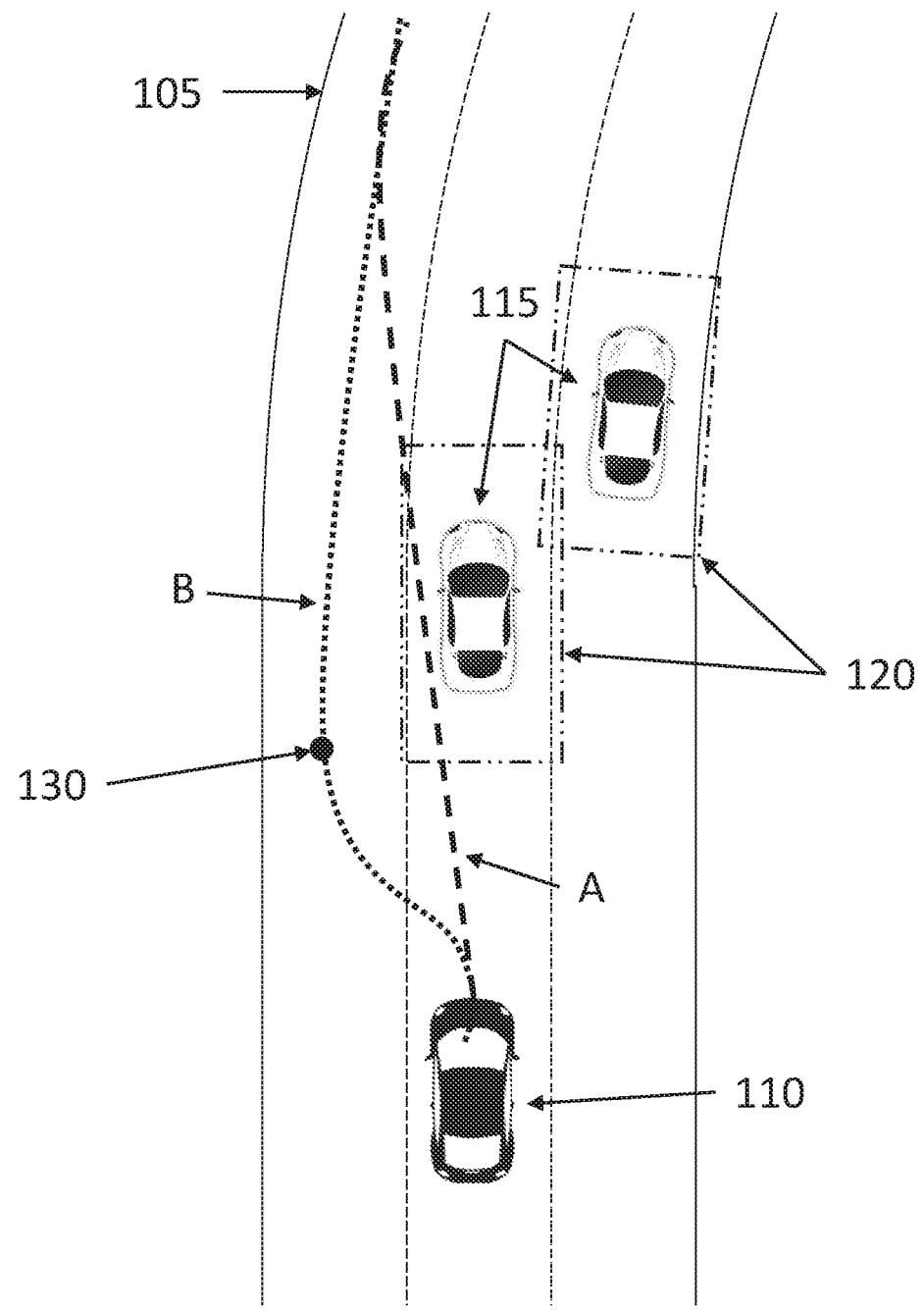
FIG. 1 shows an operating environment for dynamic multi-segment path and speed profile shaping for a motor vehicle according to an exemplary embodiment.

FIG. 1 schematically illustrates an operating environment 100 for dynamic multi-segment path and speed profile shaping for a motor vehicle 110. In this exemplary embodiment of the present disclosure, the host vehicle 110 is driving on a multilane roadway 105 along with a plurality of proximate vehicles 115 also navigating the roadway 105. The proximate vehicles 115 are shown bounded with undesirable driving areas 120 where driving is unsafe and/or undesired. The undesirable areas 120 may be areas around static or dynamic objects, lane excursions, or other undrivable regions. The exemplary environment 100 also shows a first vehicle trajectory according to traditional path (A) generated according to traditional path generation algorithms and a multipath trajectory (B) generated according to the presently disclosed systems and methods. The multipath trajectory (B) passes through a shaping point 130 generated to alter the motion trajectory of the host vehicle 110 in order to avoid the undesirable areas 120, static or dynamic obstacles or undesired lane excursion for semi-autonomous driving systems.

The exemplary system and method are operative to create a local motion trajectory that consists of multiple path segments, which plan a vehicle trajectory for safe and comfort maneuvering control. The plan motion path which keeps the host vehicle 110 away from undesirable areas to create host vehicle speed profile which allows host vehicle 110 to satisfy lateral vehicle dynamics constraints. The method is operative to adjust the terminal time without a grid search, while assuring compliance with lateral offset boundary conditions. The method is further operative to adjust the motion path of the host vehicle 110 to meet safety and comfort requirements with minimal computational complexity.

In an exemplary methodology, the system is operative to first establish a shaping point 130 location which biases motion path away from the undesirable areas 120. The method may create a circular arc to define heading and curvature at the shaping point 130. The method may then be operative to generate a 5th order polynomial to connect initial location to shaping location, and another 5th order polynomial to connect shaping location to merge location based on their boundary conditions. The method may then generate a speed profile to satisfy maximum lateral acceleration constraint of the host vehicle 110 traveling on the multipath trajectory (B).

Figure 2:
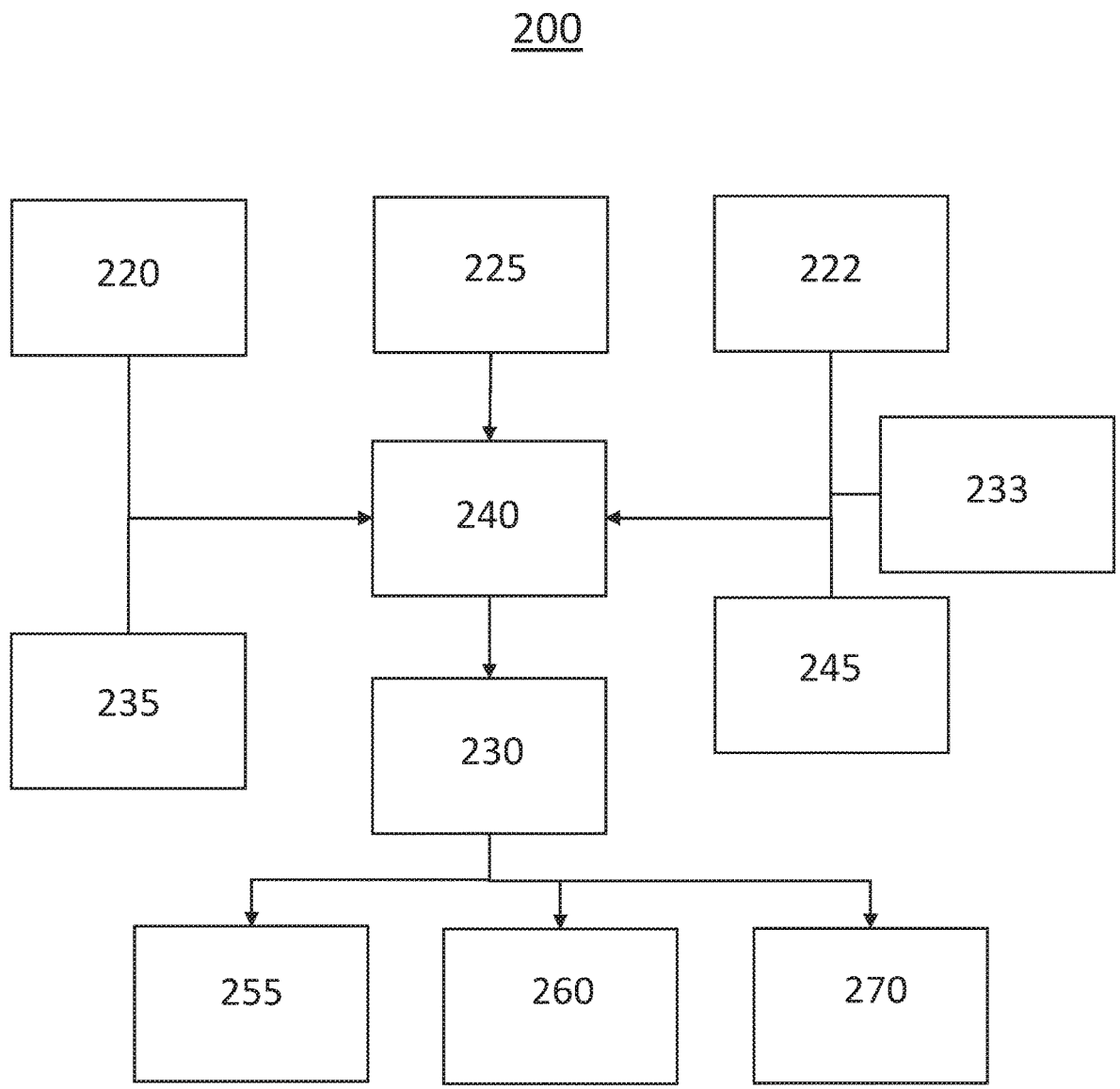
FIG. 2 shows a block diagram illustrating a system for dynamic multi-segment path and speed profile shaping for a motor vehicle according to an exemplary embodiment.

Turning now to FIG. 2, a block diagram illustrating an exemplary implementation of a system for dynamic multi-segment path and speed profile shaping for assisted driving 200 is shown. The system 200 includes a processor 240, a camera 220, a Lidar 222, a global positioning system (GPS) 225, an inertial measurement unit (IMU) 233, a user interface 235, a memory 245, a vehicle controller 230 a throttle controller 255, a brake controller 260 and a steering controller 270.

The system is operative to use various sensors such as a camera 220, IMU 233 and Lidar 222 capable of identifying and locating individual external objects. Sensor fusion algorithms provides accurate tracking of external objects as well as calculation of appropriate attributes such as relative velocities, accelerations, and the like. The camera 220 is operative to capture an image of a field of view (FOV) which may include static and dynamic objects proximate to the vehicle. Image processing techniques may be used to identify and locate objects within the FOV. These objects may then be bounded and identified as an undesirable driving area and stored in a memory or added to a reference map for the ADAS. The IMU 233 is a device used to report a specific force of a body. The IMU 233 may measure angular or linear acceleration and may be used to determine a lateral acceleration, a longitudinal acceleration, a yaw rate and pitch of a vehicle.

The Lidar 222 may be employed as a sensor on the host vehicle to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

The Lidar 222 is operative to generate a laser beam, transmit the laser beam into the FOV and capture energy reflected from a target. The Lidar 222 may employ time-of-flight to determine the distance of objects from which the pulsed laser beams are reflected. The oscillating light signal is reflected off of the object and is detected by the detector within the Lidar 222 with a phase shift that depends on the distance that the object is from the sensor. An electronic phase lock loop (PLL) may be used to extract the phase shift from the signal and that phase shift is translated to a distance by known techniques.

The user interface 235 may be a user input device, such as touch screen, dial, or button located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as initiation and selection of an ADAS function, desired following distance for adaptive cruise operations, selection of vehicle motion profiles for assisted driving, etc. In response to a selection by the vehicle operator, the user interface 235 may be operative to couple a control signal or the like to the processor 240 for activation of the ADAS function.

In this exemplary embodiment, the processor 240 is operative to perform the method for dynamic multi-segment path and speed profile shaping for assisted driving in response to signals from the forward sensor 220, the lateral sensor 225, and the user interface 235. The processor 240 may generate a two or three dimensional representation of the proximate area around the host vehicle. The processor 240 may then be operative to identify undrivable areas within the representation of the proximate area. The undrivable areas may be identified in response to objects detected within the proximate area, temporary undrivable areas, such as construction sites, and undrivable areas of the roadway, such as soft shoulders.

In an exemplary embodiment, the processor 240 is operative to generate a host vehicle motion path in response to the ADAS function. For example, the processor 240 may generate an initial host vehicle motion path for traveling in a road laneway, for performing a passing operation of an upcoming slower vehicle, for navigating a route, etc. The processor 240 is then operative to determine if the generated initial motion path passes through a undrivable area. If the motion path passes through an undrivable area, the processor is operative to generate a shaping point coordinate outside of the undrivable area in a location which biases the motion path away from the undesirable area. In an exemplary embodiment, to determine the shaping point coordinate, the processor may establish heading and curvature requirements at the shaping point by projecting a circle through three points (host position at t0 (P1), shaping point coordinate (Ps), and merge point coordinate (P2)) and then solving coefficients for two 5th order polynomials of each path segment using position, heading, and curvature constraints at each point. The $5^{th}$ order polynomial may be a quintic function of the form $y(x)=ax^5+bx^4+cx^3+dx^2+ex+f$. The processor 240 is further operative to calculate a vehicle speed profile for each of the generated motion path segments. The vehicle speed for each path segment may be calculated in response to predicted lateral acceleration of the vehicle. If the predicted lateral acceleration exceeds a threshold value, the speed of the vehicle will be reduced for the path segment. Alternatively, if the predicted lateral acceleration exceeds the threshold value, the shaping point or the merge point coordinate may be moved. A measurement from the IMU 233 may be operative for determining the lateral acceleration of the vehicle and wherein each path segment may be generated in response to the location of the vehicle and the forward speed of the vehicle The vehicle controller 230 may generate control signals for coupling to other vehicle system controllers, such as a throttle controller 255, a brake controller 260 and a steering controller 270 in order to control the operation of the vehicle in response to the ADAS algorithm. The vehicle controller may be operative to adjust the speed of the vehicle by reducing the throttle via the throttle controller 255 or to apply the friction brakes via the brake controller 260 in response to a control signals generated by the processor 240. The vehicle controller may be operative to adjust the direction of the vehicle controlling the vehicle steering via the steering controller 270 in response to a control signals generated by the processor 240.

Figure 3:
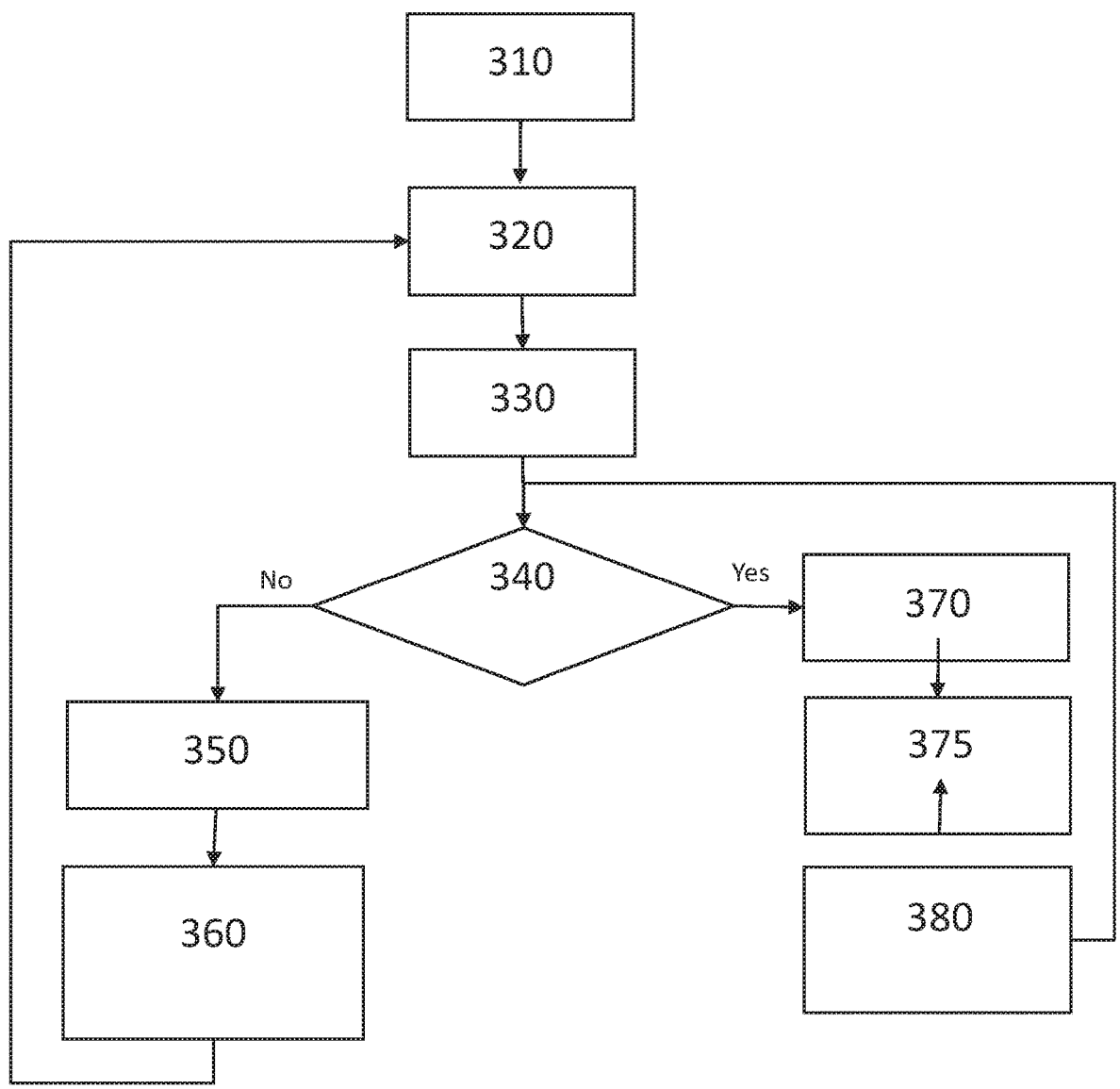
FIG. 3 shows a flow chart illustrating a method for dynamic multi-segment path and speed profile shaping for a motor vehicle according to another exemplary embodiment.

Turning now to FIG. 3, a flow chart illustrating an exemplary implementation of a method for dynamic multi-segment path and speed profile shaping for assisted driving 300 is shown. The method is first operative to perform 310 an ADAS function, such as adaptive cruise control, in response to a user input or request from a vehicle control system. To perform the ADAS function, a processor or vehicle controller may be operative to use map data, sensor data, image data and the like to generate a motion path for the host vehicle and to generate control signals for coupling to a vehicle controller for controlling the steering, throttle and braking systems of the vehicle. The method may be further operative to monitor the sensor and image data to maintain lane centering, following distances, speed, etc.

In an exemplary embodiment, the method may receive 320 an input from a sensor, such as an image from a camera or a point cloud from a lidar. The system may be operative to generate a three-dimensional representation of the proximate area around the host vehicle in response to the sensor data and/or image data and stored map data. The method is then operative to detect an object proximate to the vehicle in response to the three dimensional representation. The detected object may be bounded by a three dimensional bounding box which may define the undesirable driving area proximate to the object. Other undesirable driving areas may be determined in response to the map data, in response to a wireless transmission of data identifying the location of the undesirable driving area, or in response to the image and sensor data.

The method is next operative to calculate 330 a host motion path in response to the ADAS function. The method is then operative to determine 340 if there are any undrivable areas on the calculated motion path. If no undrivable areas are detected on the calculated motion path, the method is then operative to calculate 350 a vehicle speed profile for each segment. Then method is then operative to control 360 the vehicle along the planned path and speed profile.

If the method determines that an undrivable areas is present on the calculated motion path, the method is then operative to generate 370 a shaping point coordinate outside of the undrivable area. In an exemplary embodiment, the shaping point is generated in a position which biases the host motion path way from the undrivable area. The method is then operative to establish 375 a heading and curvature requirement at the shaping point. The method may be operative to generate a circular arch to define the heading and curvature at the shaping point. The method is then operative to calculate 380 two motion segments, one from the origin to the shaping point and one from the shaping point to a merge point. The merge point is the point at which the second motion segment merges with the original host motion path. The method is then operative to control the target path.

The method is then operative to determine 340 if an undrivable area is present on either of the two motion segments. If no undrivable areas are detected on the calculated motion paths, the method is then operative to calculate 350 a vehicle speed profile for each segment. Then method is then operative to control 360 the vehicle along the newly calculated segment paths and speed profile. If an undrivable area is present on a newly calculated motion segment, the method is operative to generate 370 a shaping point coordinate for that segment to avoid the undrivable area. The method continues until all segments are outside of undrivable areas.

Figure 4:
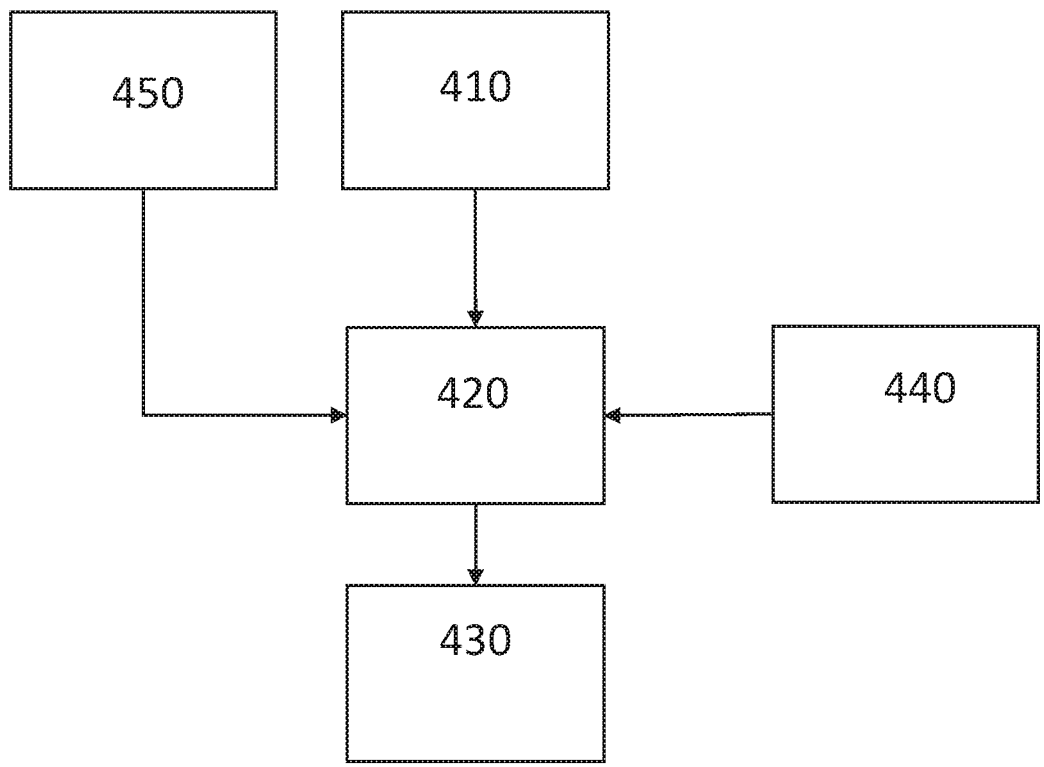
FIG. 4 shows a block diagram illustrating a system for dynamic multi-segment path and speed profile shaping for a motor vehicle according to another exemplary embodiment.

Turning now to FIG. 4, a block diagram illustrating another exemplary implementation of a system 400 for dynamic multi-segment path and speed profile shaping in a vehicle is shown. The system may be an advanced driver assistance system for controlling a host vehicle having a sensor 410, a processor 420, a vehicle controller 430, a memory 440 and a GPS sensor 450. In this exemplary embodiment, the sensor 410 is operative to detect an object within a field of view. The sensor 410 may be a camera operative to capture an image and/or an operative to generate a point map of the field of view. In an exemplary embodiment, the object is a proximate vehicle.

The system 400 further includes a vehicle controller operative to control a vehicle in response to a control signal. The vehicle controller 430 may be operative to perform an ADAS operation, or may be operative to control the vehicle subsystems, such as steering, braking, and throttle in response to a control signal generated by a processor performing an ADAS operation. In this exemplary embodiment, the vehicle controller 430 may be operative to control the vehicle such that the vehicle follows the second vehicle path and the third vehicle path generated by the processor 420.

The exemplary system may further include a memory operative to store a map data. The map data may be received via a wireless network, such as a cellular network, and may be updated periodically. In an exemplary embodiment, the map data may periodically be updated with undrivable areas. The map data may be updated in response to a location determined by the GPS sensor 450. The GPS sensor 450 may operative to determine a location of the vehicle in response to received satellite signals. The location may be refined in response to inertial measurement unit data from the vehicle controller 430 or an inertial measurement unit.

The system 400 includes a processor 420 for performing the ADAS algorithm. The processor 420 is operative for generating a first vehicle path in response to the object and the map data. The processor may then determine an undrivable area within the first vehicle path. In an exemplary embodiment, the undrivable area may be a bounded area around a proximate vehicle. The processor 420 is then operative for generating a waypoint outside of the undrivable area in response to the detection of the undrivable area within the first vehicle path. The processor 420 then generates a second vehicle path from a first point on the first vehicle path to the waypoint and a third vehicle path from the waypoint to a second point on the first vehicle path such that the second vehicle path and the third vehicle path are outside of the undrivable area. In an exemplary implementation, the second vehicle path and the third vehicle path are generated in response to a quintic function and the waypoint is generated in response to projecting a circle between a starting point and a merge point on the first vehicle path and wherein the waypoint is located on the circle between the starting point and the merge point. The first vehicle path and the second vehicle path may be generated in response to a location of the vehicle provided by the GPS 450.

The processor 420 may then generate a control signal for coupling to the vehicle controller 430 in response to the second vehicle path and the third vehicle path. The processor 420 may be further operative to predict a first lateral acceleration in response to the second vehicle path and a second lateral acceleration in response to the third vehicle path. If the first lateral acceleration or the second lateral acceleration exceed a maximum lateral acceleration limit for occupant safety and/or comfort, the processor 420 is then operative to generate a control signal for coupling the vehicle controller 430 to reduce the speed of the vehicle during the navigation of the vehicle path. The vehicle controller 430 may further be operative to control the vehicle in response to a location provided by the GPS 450 and for determining a location of the vehicle.

In an alternative exemplary embodiment, the current system is an advanced driver assistance system for controlling a host vehicle including a sensor 410 including a camera operative to capture an image of a field of view, a lidar operative to generate a point map of the field of view, and a sensor fusion processor operative to process the image and the point map to generate a three dimensional representation of the field of view. The exemplary system further includes a processor 420 operative to generate a first vehicle path in response to the three dimensional representation of the field of view, for determining an undrivable area within the first vehicle path, for generating a waypoint outside of the undrivable area, for generating a second vehicle path from a first point on the first vehicle path to the waypoint and a third vehicle path from the waypoint to a second point on the first vehicle path such that the second vehicle path and the third vehicle path are outside of the undrivable area and for generating a control signal in response to the second vehicle path and the third vehicle path and coupling the control signal to the vehicle controller. The processor 420 may be further operative to determine a maximum lateral acceleration along the second vehicle path and the third vehicle path. The vehicle controller 430 may be operative to reduce a host vehicle speed in response to the maximum lateral acceleration.

The exemplary system may further include a vehicle controller 430 operative to control the host vehicle along the second vehicle path and the third vehicle path in response to the control signal. The exemplary system may further include a memory for storing a map data and wherein the undrivable area is determined in response to the map data and a user interface operative to receive a user input and wherein the first vehicle path is generated in response to the user input.

Figure 5:
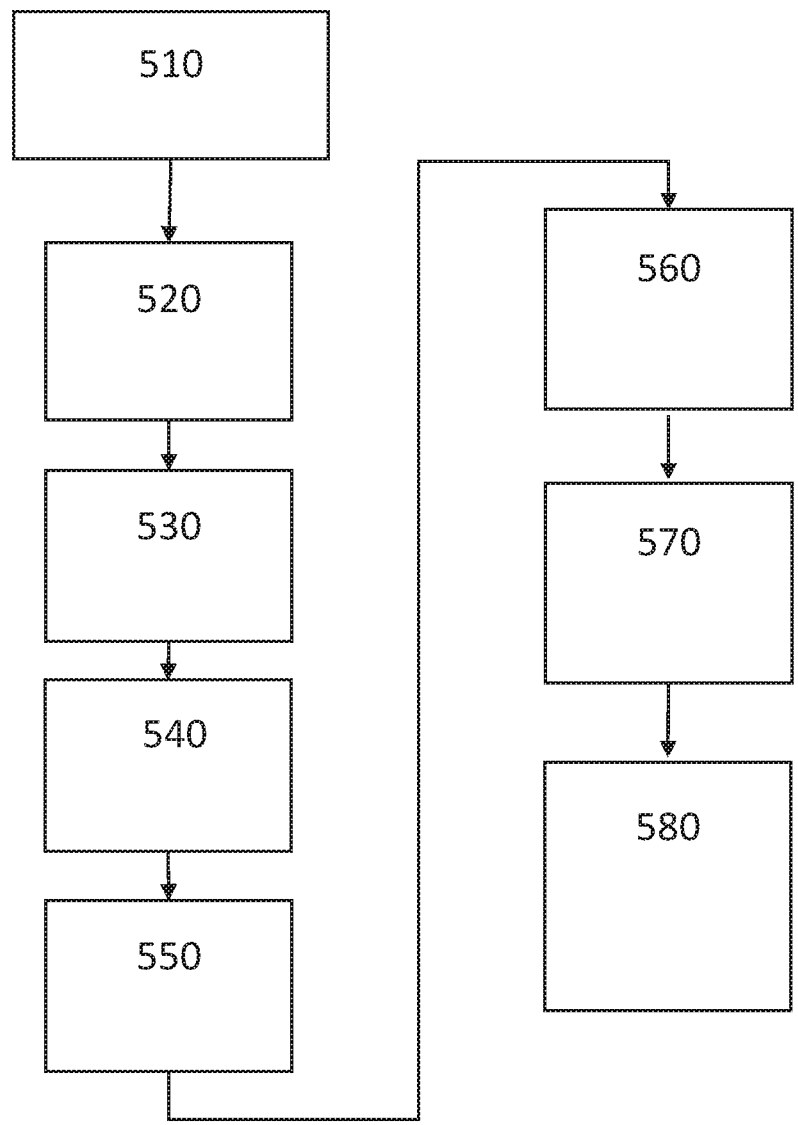
FIG. 5 shows a flow chart illustrating a method for dynamic multi-segment path and speed profile shaping for a motor vehicle according to another exemplary embodiment.

Turning now to FIG. 5, a flow chart illustrating an exemplary implementation of a system 500 for dynamic multi-segment path and speed profile shaping in a host vehicle is shown. The method is first operative to determine 510 a location of an object in response to a sensor output. The method is next operative to receive 520 a map data via a wireless network. The exemplary method is then operative to generate 530 a first vehicle path in response to the location of the host vehicle and the map data. The method may then determine 540 an undrivable area within the first vehicle path in response to a map stored in a memory or in response to the sensor output. The object may be a proximate vehicle and the undrivable area a bounded area around the proximate vehicle. In this exemplary embodiment, the method is then operative to generate 550 a waypoint outside of the undrivable area. The method then generates 560 a second vehicle path from a first point on the first vehicle path to the waypoint and a third vehicle path from the waypoint to a second point on the first vehicle path such that the second vehicle path and the third vehicle path are outside of the undrivable area. The method may then predict 570 a first lateral acceleration in response to the second vehicle path and a second lateral acceleration in response to the third vehicle path. The method is next operative to control 580 the host vehicle along the second vehicle path and the third vehicle path in response to the second vehicle path, the first lateral acceleration, the third vehicle path and the second lateral acceleration. As part of controlling the host vehicle in response method may additionally be operative to reduce the host vehicle speed in response to the first lateral acceleration exceeding a threshold lateral acceleration limit and/or the second lateral acceleration exceeding a threshold lateral acceleration limit.

In an exemplary embodiment, the sensor output may be an image captured by a camera and wherein the location of the object is determined in response to an image processing operation. In an alternative embodiment, the sensor output is a point map captured by a lidar and wherein the location of the object is determined in response to the point map. The second vehicle path and the third vehicle path may be generated in response to a quintic function and the waypoint may be generated in response to projecting a circle between a starting point and a merge point on the first vehicle path and wherein the waypoint is located on the circle between the starting point and the merge point.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
    a sensor operative to detect an object within a field of view;
    a vehicle controller operative to control a vehicle in response to a control signal;
    a memory operative to store a map data; and
    a processor for generating a first vehicle path in response to the object and the map data, for determining an undrivable area within the first vehicle path and for generating the control signal in response to the first vehicle path not intersecting the undrivable area, for generating a waypoint outside of the undrivable area in response to the first vehicle path intersecting the undrivable area, for generating a second vehicle path from a first point on the first vehicle path to the waypoint and a third vehicle path from the waypoint to a second point on the first vehicle path such that the second vehicle path and the third vehicle path are outside of the undrivable area, and for generating the control signal in response to the second vehicle path, and the third vehicle path, and for coupling the control signal to the vehicle controller.

2. The apparatus of claim 1 wherein the sensor includes a camera operative to capture an image and wherein the object is detected in response to an image processing operation.

3. The apparatus of claim 1 wherein the sensor is a lidar and wherein the object is detected in response to a point map generated by the lidar.

4. The apparatus of claim 1 further including an inertial measurement unit for determining a lateral acceleration of the vehicle and wherein the first vehicle path, the second vehicle path, and the third vehicle path are generated in response to the lateral acceleration of the vehicle.

5. The apparatus of claim 1 wherein the object is a proximate vehicle and the undrivable area is a bounded area around the proximate vehicle.

6. The apparatus of claim 1 wherein the second vehicle path and the third vehicle path are generated in response to a quintic function.

7. The apparatus of claim 1 wherein the waypoint is generated in response to projecting a circle between a starting point and a merge point on the first vehicle path and wherein the waypoint is located on the circle between the starting point and the merge point.

8. The apparatus of claim 1 further including a global positioning sensor for determining a location of the vehicle and wherein the first vehicle path and the second vehicle path are generated in response to the location of the vehicle.

9. A method performed by a processor comprising:
determining a location of an object in response to a sensor output;
receiving a map data via a wireless network;
generating a first vehicle path in response to the location of the object and the map data;
determining an undrivable area within the first vehicle path;
generating a control signal in response to the first vehicle path not intersecting the undrivable area;
generating a waypoint outside of the undrivable area in response to the first vehicle path intersecting the undrivable area;
generating a second vehicle path from a first point on the first vehicle path to the waypoint and a third vehicle path from the waypoint to a second point on the first vehicle path such that the second vehicle path and the third vehicle path are outside of the undrivable area;
generating the control signal in response to the second vehicle path and the third vehicle path; and
controlling a vehicle in response to the control signal such that the vehicle follows at least one of the first vehicle path, the second vehicle path and the third vehicle path.

10. The method of claim 9 wherein the sensor output is an image captured by a camera and wherein the location of the object is determined in response to an image processing operation.

11. The method of claim 9 wherein the sensor output is a point map captured by a lidar and wherein the location of the object is determined in response to the point map.

12. The method of claim 9 wherein the object is a proximate vehicle and wherein the undrivable area is a bounded area around the proximate vehicle.

13. The method of claim 9 wherein the second vehicle path and the third vehicle path are generated in response to a quintic function.

14. The method of claim 9 wherein the waypoint is generated in response to projecting a circle between a starting point and a merge point on the first vehicle path and wherein the waypoint is located on the circle between the starting point and the merge point.

15. The method of claim 9 further including reducing a vehicle speed in response to a first lateral acceleration exceeding a threshold lateral acceleration limit.

16. The method of claim 9 further including further including reducing a vehicle speed in response to a second lateral acceleration exceeding a threshold lateral acceleration limit.

17. An advanced driver assistance system for controlling a host vehicle comprising:
a camera operative to capture an image of a field of view;
a lidar operative to generate a point map of the field of view;
a sensor fusion processor operative to process the image and the point map to generate a three dimensional representation of the field of view;
a processor operative to generate a first vehicle path in response to the three dimensional representation of the field of view, for determining an undrivable area within the first vehicle path, for generating a control signal in response to the first vehicle path not intersecting the undrivable area, for generating a waypoint outside of the undrivable area in response to the first vehicle path intersecting the undrivable area, for generating a second vehicle path from a first point on the first vehicle path to the waypoint and a third vehicle path from the waypoint to a second point on the first vehicle path such that the second vehicle path and the third vehicle path are outside of the undrivable area and for generating the control signal in response to the second vehicle path and the third vehicle path, and for coupling the control signal to a controller; and
the controller operative to control the host vehicle in response to the control signal.

18. The advanced driver assistance system for controlling the host vehicle of claim 17 further including a memory for storing a map data and wherein the undrivable area is determined in response to the map data.

19. The advanced driver assistance system for controlling the host vehicle of claim 17 a user interface operative to receive a user input and wherein the first vehicle path is generated in response to the user input.

20. The advanced driver assistance system for controlling the host vehicle of claim 17 wherein the processor is operative to determine a maximum lateral acceleration along the second vehicle path and the third vehicle path and the controller is operative to reduce a host vehicle speed in response to the maximum lateral acceleration.

* * * * *